April 15, 1952 A. C. DE MELLO 2,592,664
FISHING TACKLE
Filed April 11, 1950
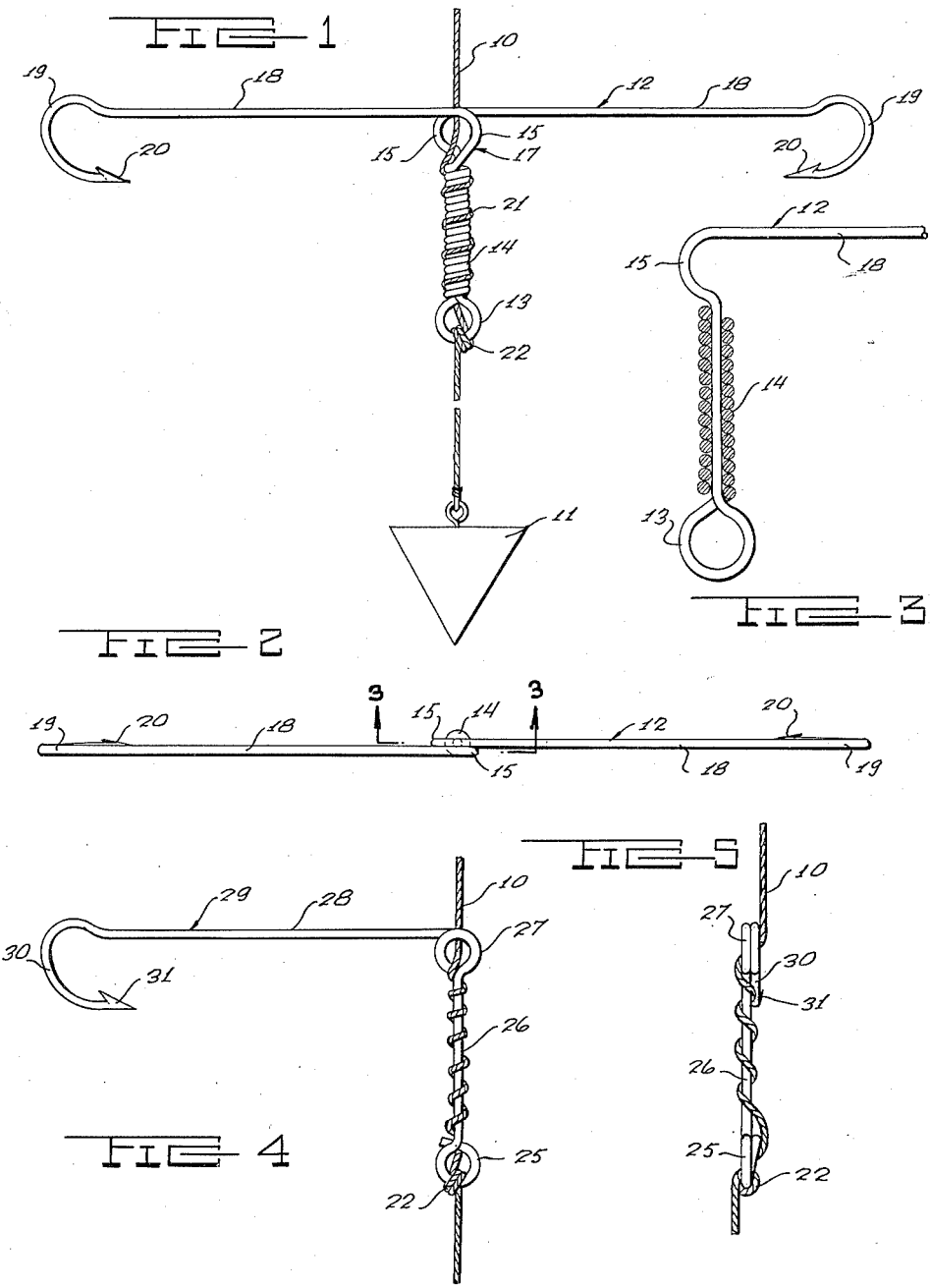
INVENTOR.
ALFRED C. DE MELLO
BY
McMorrow, Berman & Davidson
ATTORNEYS Patented Apr. 15, 1952

2,592,664

UNITED STATES PATENT OFFICE 2,592,664

FISHING TACKLE

Alfred C. De Mello, New Bedford, Mass.

Application April 11, 1950, Serial No. 155,155

1 Claim. (Cl. 43—44.82)

This invention relates generally to fishing tackle, and has more particular reference to an improved fishing hook construction including means for attaching the hook to a fishing line.

It is an object of the invention to provide a fishing hook with means for attaching the same to a fishing line which will hold the shank of the hook in a position at right angles to the fishing line, the hook portion being positioned laterally outwardly from the fishing line and extending downwardly and inwardly toward the line, the hook thus occupying a position in which it will not become snarled with the fishing line or other objects.

It is a further object of the invention to provide a fishing hook including means for easily and quickly attaching the same to a fishing line and adjusting the same longitudinally thereon without the use of knots.

Another object of the invention is to provide in a fishing hook of the above mentioned character an integral construction in which the fishing hook and the attaching means therefor are formed of a single continuous piece of material, in order to provide a device of simple and low-cost construction.

Further objects and features of the present invention will become apparent from the following description when considered in connection with the accompanying drawing, and the invention consists in the novel form, combination and arrangement of parts hereinafter more fully described, shown in such drawing, and claimed.

In the drawing:

Figure 1 is an elevational view showing a fishing line equipped with a hook constructed in accordance with the present invention.

Figure 2 is a top plan view of the fishing hook.

Figure 3 is a partial sectional view taken on the line 3—3 of Figure 2.

Figure 4 is a view similar to Figure 1 but showing a modified construction of a fishing hook.

Figure 5 is an end elevational view of the fishing hook shown in Figure 4.

Referring in detail to the drawing, Figure 1 shows a fishing line 10 to which is attached a sinker 11 and a fishing hook 12 constructed according to the invention.

The fishing hook 12 is a double hook arrangement and consists of a length of wire bent upon itself intermediate its ends to form a straight portion and a coiled portion, the coiled portion being formed about the straight portion between its ends to form a brace portion 14 having a loop 13 at its inner end, with one of the portions of the wire adjacent the outer end of the brace portion 14 being bent to form a half loop 15 facing in one direction and the other of the portions of the wire adjacent the other end of the brace portion 14 being bent to form a complemental half loop 15 facing in the opposite direction, the half loops 15 together forming a loop 17 at the outer end of the brace portion 14. From the loop 17 the end portions of the wire extend in opposite directions and at right angles to the straight portion to form straight shank portions 18. From the terminating ends of the shank portions 18 the two wire portions are bent to form hook members 19 which terminate in barbed points 20. The hook portions 19 are directed downwardly and inwardly, as shown in Figure 1.

The fishing hook is attached to the fishing line as shown in Figure 1. The fishing line 10 is passed through the loop 17, then wound around the brace member 14 several times as shown at 21 and then passed through the loop member 13 several times as shown at 22, after which it is attached to the sinker 11. This will securely hold the fishing hook 12 to the fishing line 10 without the use of knots. Due to the attachment of the fishing line 10 to the brace member 14 and to the pull of the sinker 11, the shank portions 18 of the fishing hook will be held in a position extending at right angles to the fishing line 10 and the hook portions 19 will be located in an outwardly spaced position relative to the fishing line, with the hook portions 19 directed downwardly and inwardly toward the line. This position of the hook portions 19 facilitates the engagement of the hook in the mouth of a fish, since the barbs 20 will enter the lower jaw of the fish and be retained therein. Also, this position of the hook portions 19 and barbs 20 will reduce the tendency of the hooks to snarl in the line or snag on objects in the water or on the bottom. Furthermore, the provision of the two oppositely disposed hooks provides a balanced arrangement which assists in maintaining the shanks of the hooks at right angles to the fishing line.

Figure 4 shows a modified form of hook construction employing a single hook in place of the pair of hooks shown in Figure 1. In this form a length of wire is bent at one end to form a closed loop 25. From loop 25 the wire is extended to form a straight brace member 26. A closed loop 27 is formed at the other end of the brace member 26. From the loop 27 the wire extends at right angles to the brace member 26 to form the straight shank portion 28 of the fishing hook 29. At the outer end of the shank portion 28, the wire is curved to form the hook portion 30 terminating in a barbed point 31. This form of fishing hook is attached to the fishing line in the same manner as the form shown in Figure 1. Due to the brace member 26 and the weight of the sinker, the shank 28 of the fishing hook 29 will be held in a position at right angles to the fishing line 10 in the same manner as in the fishing hook shown in Figure 1.

Obviously, as many of these fishing hooks as desired may be attached to a single fishing line, and they may be spaced from each other and located in a staggered relation as desired. Since no knots are employed in securing the fishing hook to the fishing line, the fishing hook may be easily adjusted longitudinally thereon and releasably secured in any desired position.

Both in the Figure 1 and the Figure 4 modifications are formed from a single length of wire and as such are adapted to low cost production, and are durable in construction.

It will be apparent that the invention is susceptible of various minor changes and modifications such as fairly fall within the spirit and scope of the invention as claimed.

I claim:

A fishing hook formed of a length of wire bent upon itself intermediate its ends to form a straight portion and a coiled portion, said coiled portion being formed about said straight portion between its ends to form a brace portion having a loop at its inner and outer ends, the end portions of said wire extending in opposite directions from the loop on the outer end of said brace portion and at right angles thereto to form straight shank portions, and a hook portion terminating in a barbed point on the terminating end of each of said shank portions.

ALFRED C. DE MELLO.

REFERENCES CITED

The following references are of record in the file of this patent:

UNITED STATES PATENTS

| Number | Name | Date |
|---|---|---|
| 787,806 | Torgerson | Apr. 18, 1905 |
| 814,624 | Robinson | Mar. 6, 1906 |
| 1,720,287 | Moore | July 9, 1929 |
| 2,274,131 | Edberg | Feb. 24, 1942 |

FOREIGN PATENTS

| Number | Country | Date |
|---|---|---|
| 30,533 | Great Britain | Jan. 29, 1898 |